(12) United States Patent
Savaresi et al.

(10) Patent No.: US 11,663,844 B2
(45) Date of Patent: May 30, 2023

(54) HEAD-COUNTER DEVICE AND METHOD FOR PROCESSING DIGITAL IMAGES

(71) Applicant: BLIMP S.R.L., Milan (IT)

(72) Inventors: Sergio Matteo Savaresi, Cremona (IT); Alex Buzzetti, Milan (IT); Niccolò Guido Uberto Valerio, Milan (IT); Mattia Campana, Comun Nuovo (IT); Fabio Previdi, Bergamo (IT); Gabriele Maroni, Torre Boldone (IT); Michele Ermidoro, Bergamo (IT)

(73) Assignee: BLIMP S.R.L., Milan (IT)

( * ) Notice: Subject to any disclaimer, the term of this patent is extended or adjusted under 35 U.S.C. 154(b) by 0 days.

(21) Appl. No.: 17/058,850

(22) PCT Filed: May 24, 2019

(86) PCT No.: PCT/IB2019/054322
§ 371 (c)(1),
(2) Date: Nov. 25, 2020

(87) PCT Pub. No.: WO2019/224791
PCT Pub. Date: Nov. 28, 2019

(65) Prior Publication Data
US 2021/0216784 A1 Jul. 15, 2021

(30) Foreign Application Priority Data
May 25, 2018 (IT) .......................... 102018000003188

(51) Int. Cl.
*G06K 9/00* (2022.01)
*G06V 20/52* (2022.01)
(Continued)

(52) U.S. Cl.
CPC .............. *G06V 20/52* (2022.01); *G06V 20/13* (2022.01); *G06V 40/103* (2022.01);
(Continued)

(58) Field of Classification Search
CPC .................................................... G06V 20/52
See application file for complete search history.

(56) References Cited

U.S. PATENT DOCUMENTS 8,406,515 B2 * 3/2013 Cheatle ..................... G06T 3/00
382/164
9,449,506 B1 9/2016 Whiting et al.
(Continued)

FOREIGN PATENT DOCUMENTS

| EP | 2693373 A1 | 2/2014 |
| EP | 3021583 A1 | 5/2016 |
| WO | WO-2019224791 A1 | 11/2019 |

OTHER PUBLICATIONS

International Search Report and Written Opinion for International Application No. PCT/IB2019/054322, European Patent Office, Netherlands, dated Sep. 19, 2019, 11 pages.
(Continued)

*Primary Examiner* — Oneal R Mistry
(74) *Attorney, Agent, or Firm* — Sterne, Kessler, Goldstein & Fox P.L.L.C.

(57) ABSTRACT

A head-counter device (100) comprising a digital camera (1) adapted to provide a first digital image (IM1) representative of a counting zone (STR) of persons, the first image defining a first horizontal dimension (N) and a first vertical dimension (M), and a cropping module (7) configured for: analyzing the first image (IM1) and identifying a noise area (PCR) according to at least one of the following features: pixel light intensity, pixel color and/or presence of pre-defined patterns, cropping the noise area (PCR) from the first image (IM1) to obtain a second image (IM2) without the noise area, the noise area (PCR) being a peripheral portion of the first image having said first horizontal dimension and having a second vertical dimension (M−DSK+SM) shorter than the first vertical dimension.

9 Claims, 2 Drawing Sheets

(51) Int. Cl.
  *G06V 20/13* (2022.01)
  *G06V 40/10* (2022.01)
  *G06V 40/16* (2022.01)
(52) U.S. Cl.
  CPC .......... *G06V 40/161* (2022.01); *G06V 40/172* (2022.01); *G06T 2207/20132* (2013.01); *G06T 2207/30196* (2013.01); *G06T 2207/30242* (2013.01)

(56) References Cited

U.S. PATENT DOCUMENTS

| | | | | |
|---|---|---|---|---|
| 2007/0126868 | A1* | 6/2007 | Kiyohara | G06T 7/246 348/143 |
| 2010/0329550 | A1* | 12/2010 | Cheatle | G06T 3/00 382/165 |
| 2015/0228067 | A1* | 8/2015 | Downing | G06T 7/70 382/173 |
| 2016/0267326 | A1* | 9/2016 | Yagev | G06V 10/507 |
| 2018/0150684 | A1* | 5/2018 | Wang | G06V 40/168 |
| 2018/0152667 | A1* | 5/2018 | Taine | H04N 7/15 |
| 2018/0285629 | A1* | 10/2018 | Son | G06V 10/809 |
| 2019/0258866 | A1* | 8/2019 | Khadloya | G06V 20/40 |

OTHER PUBLICATIONS

Li, M., et al., "Estimating the number of people in crowded scenes by MID based foreground segmentations and head-shoulder detection," 19$^{th}$ *International Conference on Pattern Recognition—Tampa, FL* (Dec. 8-11, 2008), 68 pages, Institute of Electrical and Electronics Engineers, United States (published in print 2008; available online Jan. 23, 2009).

* cited by examiner

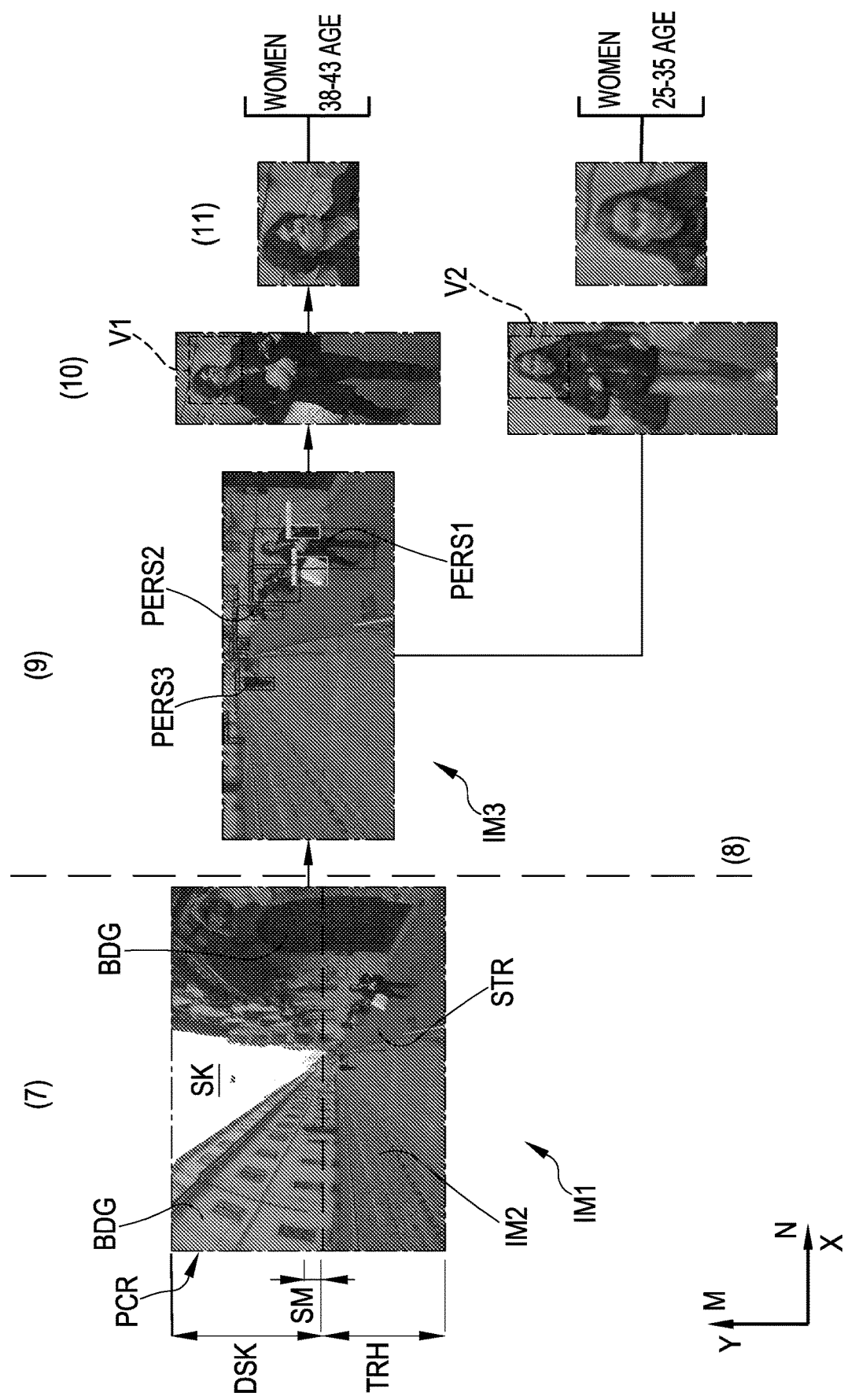

HEAD-COUNTER DEVICE AND METHOD FOR PROCESSING DIGITAL IMAGES

TECHNICAL FIELD

The present invention relates to digital image processing techniques that can be used for devices known as head-counters.

STATE OF ART

The counting of persons is interesting, among other things, for statistical analyses aimed at commercial evaluations. Indeed, persons stationed in front of a shop window or walking through a shopping center can be counted in order to assess the attractiveness of such places.

Known head-counter devices automatically count persons who stop or transit in a specific area. The count is carried out by processing digital images that show the area of interest.

US-A-2010232644 describes a method for analyzing the number of persons observing a billboard based on the processing of images obtained from a digital camera.

U.S. Pat. No. 5,465,115 describes a method for monitoring of persons that simultaneously enter and exit from a pedestrian area such as the entry of a commerce location, based on the processing of video images.

U.S. Pat. No. 9,449,506 B1 describes a head-counter device which automatically detects an area of interest by means of an object movement analysis which analyzes the movement of persons moving through the area of interest.

US 2016/0110613 describes a head counter device which counts persons present in a preset region of interest and U.S. Pat. No. 6,282,317 describes a method for recognizing skies, patterns, vegetations and persons in images.

However, said known devices and methods are relatively complex and/or have structural precision and/or efficiency limits in counting the number of persons, in particular in a crowded and limited area, compared to the whole area framed by the camera.

SUMMARY OF THE INVENTION

The present invention addresses the problem of providing a technique for counting persons, usable in open space (i.e. outdoor) applications that combines counting precision and computational speed.

In particular, the present invention relates to a head-counter device as defined by claim 1 and by its preferred embodiments, defined by the dependent claims.

The subject of the present invention is also a method for processing digital images as defined by claim 13.

BRIEF DESCRIPTION OF THE DRAWINGS

The present invention is hereinafter described in detail, by way of a non-limiting example, with reference to the accompanying drawings, in which:

FIG. 2 refers to some example steps of the digital image processing method in accordance with the present invention.

DETAILED DESCRIPTION

Figure 1:
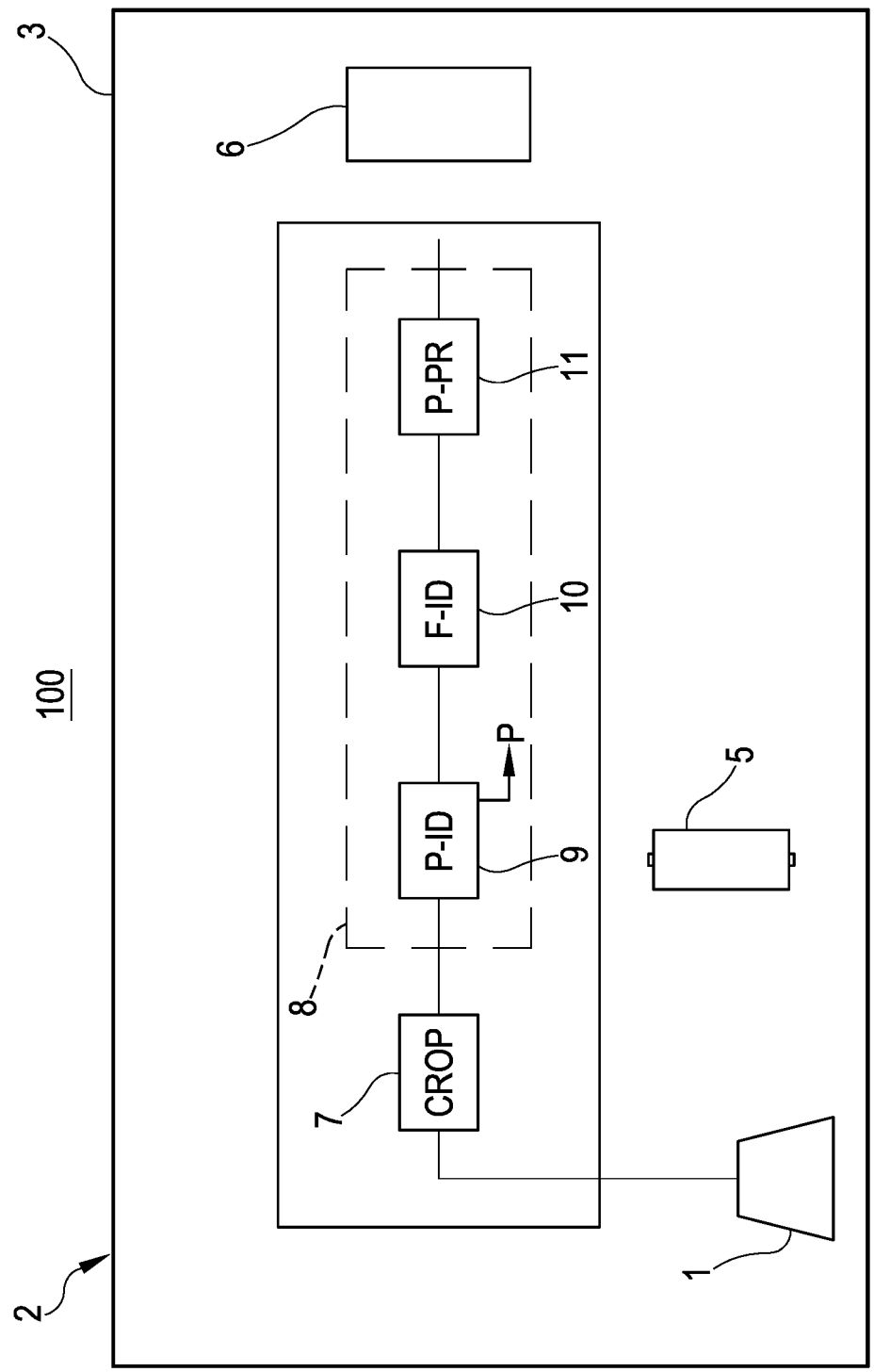
FIG. 1 shows schematically an example of a head-counter device.

While the invention it is susceptible of various modifications and alternative constructions, some particular embodiments are shown in the drawings and will be described in detail below. In the present description, similar or identical elements or components will be indicated in the figures with the same identification symbol.

FIG. 1 shows a head-counter device 100 comprising a digital camera 1 and a digital image processing module 2. The digital camera 1 is, advantageously, a high resolution camera capable of capturing images, for example, up to a distance of 60 meters.

The processing module 2 is, for example, a microcontroller suitable for running a digital image processing software.

The head-counter device 100 comprises, preferably, an electric battery 5 or can be connected to an external electric power source, for its electric supply. Moreover, the head-counter device 100 can be provided with a communication module 6, suitable for transmitting data/information outside the device itself and, in particular, to a cloud system. In particular, this data/information is "metadata" and thus does not include digital images provided by the digital camera 1 but includes only the aggregate result that comes from the digital image processing which will be described by way of example in the following.

The head-counter device 100 may have a container 3 which houses the above-mentioned components and is also provided with mechanical means for its fastening to a support.

The head-counter device 100 is suitable for counting the presence of persons in an outdoor area and is therefore suitable to operate in the outdoor area (even if in a non-exclusive way). The head-counter device 100 can be used for counting persons crossing or walking through a determined area such as, for example: a square, a road, a sidewalk. Furthermore, the head-counter device 100 can be used not only for counting persons but also for counting vehicles or animals. The term "persons" means, for the purposes of the present invention, humans, vehicles or animals.

The head-counter device 100 can be mounted outside any static object (such as for example a pole, a billboard and the facade of a building), on a moving vehicle (such as a car, a bicycle, a bus) or it can be used as an item that can be carried by a person.

The processing module 2 is configured to receive a digital image provided by the camera 1, to recognize the presence of the persons present in the image and to count their number. In greater detail, the processing module 2 is provided with a cutting or cropping module 7 (CROP), configured for the removal of noise, and with an analysis and count module 8. According to an embodiment, the analysis and count module 8 includes a person identification module 9 (P-ID), a person face identification module 10 (F-ID) and a person profiling module 11 (P-PR).

The modules 7-11 listed above can correspond to code portions of a digital image processing software which can also be marketed independently from the camera 1 and which can be run, for example, in a processor far from the camera itself.

The operation of the head-counter device 100 will be described below also with reference to FIG. 2 which shows, by way of example, the processing of a digital image. The functions performed by modules 7-11 correspond to steps of a digital image processing method.

In this example, it is assumed that the head-counter device 100 is mounted on a wall of a building and that it frames an external scene relating to a street, with side buildings and sidewalks on which persons can walk.

The digital camera 1 provides an image according to a predetermined frequency. It is assumed that the digital camera 1 supplies to the processing module 2 a first image IM1 having one first horizontal dimension N (along a horizontal axis x) and a first vertical dimension M (along a vertical axis y). The N and M values can be the same or different. The N×M dimensions of the first image IM1 refer, as it is evident to the skilled person in the art, to the number of pixels contained in the first image IM1.

The cropping module 7 receives the first image IM1 (namely the digital data defining it) and analyzes it in order to identify a noise area PCR. The noise area PCR is an area of the image that inherently is of no interest for the counting of persons and is associated with scenarios incompatible with the presence of persons transiting.

Incompatible scenarios are those areas where it is not presumable to identify persons transiting. For example, noise areas are those portions of the images relating to the sky, vegetation (for example trees) and walls of buildings. The noise area may also relate to a combination of sky areas, building walls or tree/vegetation extremes.

The noise area PCR is identified according to a processing that takes into account at least one of the following features: light intensity of the pixels, pixel color, presence of pre-defined patterns.

According to a particular example, the cropping module 7 identifies in the first image IM1 areas related to the presence of sky SK (namely of an area of the image related to a no-interest area for the counting of persons). The identification of the sky SK is carried out by analyzing the light intensity of the three RGB (Red Green Blue) channels associated with the pixels, assuming that portions of images adjacent to one another which are characterized by pixels with a predominance of the blue color are relative to the sky.

Advantageously, in order to avoid false detections for example due to blue objects (cars) or areas with reflections of the sky, the sky SK is identified, among other areas of blue color which are present, as the one which has the largest area and/or has a higher density of blue pixels.

If a significant presence of the sky is determined in the first image IM1, a peripheral portion PCR which contains this sky, extends over the entire horizontal dimension N and has a vertical length equal to a value DSK determined according the extension of the sky, is removed from this image. For example, the portion PCR indicated in FIG. 2 by a hatch, having horizontal coordinates x comprised between 0 and N and vertical coordinates y comprised between M and M−DSK, can be cropped.

Advantageously, once the portion PCR of the sky to be cropped is identified (and therefore its value on the y axis), a safety margin SM is subtracted therefrom in order to reduce the portion PCR of the sky to be cropped: PCR-SM.

If the portion of the image associated with the sky does not cover a significant area with respect to the dimension M (for example, it extends along the vertical axis y for a length significantly shorter than M) an analysis is also provided for identifying the presence of areas that show facades of buildings BDG at heights (along the y axis) higher than those that are of interest for the purpose of counting persons. For example, if the detected portion of the sky, in terms of vertical dimension on the vertical axis y, is less than 20% of the entire vertical dimension M of the image, then the analysis on the facades of the buildings is applied.

In this regard, an exemplifying situation is considered, in which the camera 1 is mounted on a pole/building at a height higher than that of the man, in order to be able to frame the area of interest this camera must be tilted downwards at a certain angle. Since the image is therefore sampled at a downward angle, the portion of the sky should be reduced or even be absent. In this exemplifying situation, the facades of the buildings (if present in the image and therefore correctly detected) are used for the subsequent processing steps.

The walls of buildings can be identified through the recognition of predefined patterns, relative to typical architectural elements of the buildings, such as, preferably, the windows. In fact, the windows are recognizable by the presence of horizontal lines or contours (windowsills or architraves) and vertical (the jambs).

The typical window structure also allows to identify a horizontal line connecting the sills of more windows of a same housing level (for example, the first floor or the second floor). This horizontal line may constitute a lower limit for the definition of the noise area PCR. For example, this line may correspond to a threshold value TRH (expressed as a number of pixels).

Once the noise area PCR, including in the example of FIG. 2 both a portion of sky SK and a portion relative to the facades of the building BDG, is identified, the noise area PCR is cut out, namely removed from the first image IM1.

To locate a noise area PCR with the presence of vegetation (for example, a background with trees) the processing is based on the light intensity of the pixels of the first image IM1, associated with the green color. Thus, also the noise area PCR related to vegetation (occupying a peripheral portion of the first image IM1 at a height along the vertical y-axis higher than the threshold value TRH) is cropped as in the case of the sky SK or of the facades of buildings BDG.

A second image IM2 having a reduced number of pixels compared to the first image IM1, namely not with a size N×M but with a reduced size: (M−DSK+SM))×N, is obtained from the cropping.

It should be noted that, advantageously, also a resizing step can be foreseen (for example carried out by the same cropping module 7), in which the second image IM2 resulting from the cutting or cropping phase is returned to the size of the first image IM1. This resizing can be done by adding to the second image IM2 additional pixels generated starting from the pixels already existing in this image resulting from the cropping. These additional pixels can be obtained, for example, from a linear interpolation of adjacent pixels or from averages on adjacent pixels.

It is remarked that the set of the cropping step carried out by the cropping module 7 and the subsequent resizing to the initial value N×M corresponds to a digital zoom operation carried out on the portion of the image relevant for the purposes of counting persons and without (or substantially lacking of) sky, vegetation and walls of buildings.

Crop and resize operations can be performed by means of a software suitably configured for the functions described above and based, for example, on image processing techniques known to the expert in the field.

Following to the cropping and resizing (7) a third digital image IM3 is obtained which is supplied to the analysis and count module 8 and then to the person identification module 9.

The person identification module 9 processes the third image IM3 by applying an algorithm (which can be of a known type), suitable for recognizing the presence of persons and allows to identify a certain number of persons PERS1-PERS3 in this image For example, a number of persons P equal to 3 is identified. It is also possible that an image does not portray any person and the person identification module 9 returns a counting value P equal to 0.

The person face identification module 10 processes the portions of images relating to persons PERS1-PERS3 identified above so as to distinguish their faces: for example the two faces V1 and V2.

The person profiling module 11 processes (by applying an algorithm that may be of known type) images relating to the faces V1 and V2 and generates profiling information, relating to the persons framed by the camera 1. In particular, this profiling information relates to gender (MEN or WOMEN) of the framed person or his/her estimated age (AGE), for example, expressed by a range.

The person profiling module 11 can also be equipped with an algorithm (for example, of a known type) which allows to estimate the attention of the analyzed person for a reference item such as, for example, a shop window, a billboard, a display or other. This estimate can be made, for example, on the basis of the orientation of the head and the eyes and the time spent by the person in observing the item.

Both the count number P and the profiling data (metadata) related to gender and age and/or to the attention can be stored locally or, preferably, sent to a cloud server (not shown) through the communication module 6.

The processing carried out by the analysis and count module 8 can also be implemented by means of a neural network. For example, an R-FCN network (Region-based Fully Convolutional Network) can be used, such as, in particular, a network like the one described in the document: Jifeng Dai et al., "R-FCN: Object Detection via Region-based Fully Convolutional Networks", —21 Jun. 2016.

It should be noted that, thanks to the cropping operation as described above, the processing performed by the analysis and count module 8 is fully suitable for outdoor applications, with high performance. In fact, the elimination of the noise areas PCR performed as described above allows the identification and counting steps (9), as well as the profiling steps (11) to be performed on a digital image (i.e. the third image IM3) in which the portion with possible presence of persons is increased (in relative dimensions), with respect to the relative dimensions that the same portion has within the first image IM1. This makes the processing carried out by the analysis and count module 8 more precise, less computationally burdensome and faster than those that would have been obtained by directly processing the first image IM1.

It is also worth observing that since the recognition and cropping of the noise areas PCR is performed automatically by the software of the cropping module 7, complex configuration operations of the head-counter device 100, whose purpose is to maximize the framing of the area affected by the passage of persons with respect to the sky or other areas of no interest, are not required during installation of the same in a given position.

Furthermore, the automatic cropping of the sky, the facades of buildings and the trees, carried out by the head-counter device 100, allows its use also in motion (on vehicles or carried by persons).

It should be noted that the possibility of processing the images locally, namely within the head-counter device 100, appears advantageous in that it eliminates the delays due to the transmission of the data corresponding to the digital images taken, typical of a remote processing.

It should be observed also that the local (namely at the head-counter device 100) image processing allows not to violate privacy norms by avoiding that any person may access to the processed images, thus making it impossible to identify the framed persons. Once processed, the image can be deleted and only the metadata corresponding to the number of persons detected, gender and age are transmitted in an aggregate manner to the cloud server.

Possible variations or additions can be made by those skilled in the art to the embodiment described and illustrated herein while remaining within the scope of the following claims. In particular, further embodiments may comprise the technical characteristics of one of the following claims with the addition of one or more technical features described in the text or illustrated in the drawings, taken individually or in any combination thereof.

The invention claimed is:

1. A digital image processing method, comprising carrying out in order the following steps:
   receiving a first digital image (IM1) representing a counting zone (STR) of persons, the first image defining a first horizontal dimension (N) and a first vertical dimension (M);
   carrying out a pre-processing phase comprising the following steps:
      analyzing the first image (IM1) without searching in order to recognize persons, but only in order to identify a noise area (PCR), wherein said noise area is an area of the image that is associated with scenarios incompatible with the presence of persons, according to the following features of said noise area: pixel light intensity, pixel color, presence of predefined patterns,
      identifying said noise area (PCR) according to the following backgrounds: sky, vegetation, buildings, shown in the first image (IM1) by means of at least one of the following steps:
         identifying the sky background (SK) according to the light intensity of the pixels of the first image (IM1) associated with the blue color,
         identifying the vegetation background according to the light intensity of the pixels of the first image (IM1) associated with the green color,
         identifying the building background (BDG) according to patterns of architectural elements recognizable in said first image (IM1);
      cropping the noise area (PCR) from the first image (IM1) to obtain a second image (IM2) without the noise area, the noise area being a peripheral portion of the first image having said first horizontal dimension and having a second vertical dimension (M−DSK+SM) shorter than the first vertical dimension;
      processing said second imagine (IM2) recognizing at least one person shown in the second image (IM2) and providing a count number (P) of said at least one person in said counting zone (STR).

2. The digital processing method of claim 1, comprising the step of resizing the second image (IM2) without the noise area (PCR) to obtain a third image (IM3) having the first horizontal dimension (N) and the first vertical dimension (M); wherein said step of processing is carried out on said rectangular third digital image (IM3) for recognizing at least one person shown in the third digital image (IM3) and for providing a count number (P) of said at least one person in said counting zone (STR).

3. The digital processing method of claim 2, comprising the step of obtaining the third image (IM3) according to the generation of additional pixels calculated by processing further pixels present in the second image (IM2).

4. The digital processing method of claim 3, comprising the step of generating the additional pixels by performing a linear interpolation of said further pixels present in the second image (IM2).

5. The digital processing method of claim 4, comprising the steps of:
- identifying the face of a person represented in the third image (IM3);
- estimating age and/or gender of a person represented in the third image (IM3);
- providing an attention estimate value of a person represented in the third image (IM3) towards a predefined item.

6. The digital processing method of claim 1, further comprising the step of identifying the sky (SK) or the vegetation is identified as the area that has the widest area and/or has a higher pixel density compared to other areas of blue or green color, respectively, present in the first image (IM1).

7. The digital processing method of claim 1, further comprising the following step:
- if a significant presence of the sky (SK) or vegetation in the first image (IM1) is determined, removing from the first image (IM1) a noise area (PCR) containing such sky (SK) or vegetation, which extends over the entire horizontal dimension (N) of the first image and which has a vertical length equal to a value (DSK) established according the extension of the sky (SK) or of the vegetation.

8. The digital processing method of claim 1, comprising the step of identifying the building background (BDG) by a horizontal line (TRH) which forms a lower limit for the definition of the noise area (PCR).

9. The digital processing method of claim 1, comprising the step of subtracting a safety margin (SM) from the noise area (PCR) to reduce the rectangular second image (IM2) to be cropped from the first image (IM1).

* * * * *